US005457493A

United States Patent [19]
Leddy et al.

[11] Patent Number: 5,457,493
[45] Date of Patent: Oct. 10, 1995

[54] DIGITAL MICRO-MIRROR BASED IMAGE SIMULATION SYSTEM

[75] Inventors: Michael Leddy, Dallas; Mark Boysel, Plano; James A. Delong, Shady Shores; James M. Florence, Richardson; Tsen-Hwang Lin, Dallas; Jeffrey Sampsell, Plano, all of Tex.

[73] Assignee: Texas Instruments Incorporated, Dallas, Tex.

[21] Appl. No.: 121,710

[22] Filed: Sep. 15, 1993

[51] Int. Cl.[6] .......................... H04N 5/33; H04N 17/00
[52] U.S. Cl. .......................... 348/164; 348/181; 348/187
[58] Field of Search ................................ 348/164, 181, 348/187; H04N 7/18, 5/33, 17/00

[56] References Cited

U.S. PATENT DOCUMENTS

| | | |
|---|---|---|
| 4,680,579 | 7/1987 | Ott . |
| 4,698,602 | 10/1987 | Armitage ............................. 359/294 |
| 4,954,789 | 9/1990 | Sampsell . |
| 5,061,049 | 10/1991 | Hornbeck . |
| 5,096,279 | 3/1992 | Hornbeck et al. . |
| 5,148,157 | 9/1992 | Florence . |
| 5,278,652 | 1/1994 | Urbanus et al. . |

OTHER PUBLICATIONS

Kenneth J. Barnard, "Crosstalk Analysis of a Deformable–Mirror–Based Infrared Scene Projector," doctoral dissertation, University of Central Florida, Orlando, Florida, 1992.

Optron Systems, Inc. Brochure, Jan. 1, 1992.

Primary Examiner—Howard W. Britton
Attorney, Agent, or Firm—Charles A. Brill; James C. Kesterson; Richard L. Donaldson

[57] ABSTRACT

An image simulation system 20 for testing sensor systems 26 and for training image sensor personnel wherein synthetic image data is generated by a scene generator 21 and projected by an image projector 23. The image projector 23 uses a digital micromirror device array 27 to modulate the incident energy and create an image. Four modulation schemes are discussed including digital pulse-width modulation, phase contrast modulation, full complex modulation, and analog modulation. The digital pulse width modulation technique will typically require synchronizing the image sensor and the image projector. Phase contrast modulation, full complex modulation, and analog modulation do not require synchronizing the image projector 23 and the sensor system 26. Phase contrast modulation and full complex modulation have the capability to produce phase information within the image. The image simulation system 20 can produce high contrast images and is more flexible than prior art system.

20 Claims, 10 Drawing Sheets

DIGITAL MICRO-MIRROR BASED IMAGE SIMULATION SYSTEM

BACKGROUND OF THE INVENTION

1. Field of the Invention

This invention relates to the field of scene generation systems and more particularly to non-visible image simulation systems.

2. Background of the Invention

Image sensors detect electromagnetic radiation from a scene and output electrical or optical information extracted from the scene. Examples of systems with image sensors include night and inclement weather vision systems and forward looking infrared (FLIR) navigation systems. Image sensors are becoming more prevalent as the cost to produce such systems decreases and the capabilities of such systems increase. As the quantity and complexity of such systems has increased, the need for generating and projecting synthetic images for input into the image sensors has also grown. There are several difficult technical issues associated with image sensors including initial design optimization, design verification, production testing, and user training. These issues are generally more difficult when dealing with non-visible systems than with visual systems. Present non-visible image simulation systems typically provide insufficient resolution, marginal contrast ratios, low frame or update rates, image smearing and excessive persistence due to the emission from the projection device. Present systems are typically designed for use only with a single image sensor and typically do not create phase information within images.

State of the art infrared systems production testing methods typically inject an electrical test signal for the sensor system to process. Signal injection is not an optimum test method because the image detector with its related electronics and associated gimbals and optics are not tested. The optics and detector of the system are usually tested separately using a very simple static scene or test pattern or a very slowly moving, but somewhat more complex series of synthetic scenes. This two-part test methodology does not perform an end-to-end test of the entire system. Providing a realistic image for input to the image sensor has often required field testing the image sensor which can be very expensive for complex systems. A need exists in the art for an image projection system that can generate and project high-quality images both in real-time and non-real-time, for input into an image sensor.

SUMMARY OF THE INVENTION

The present invention provides an image simulation system having a scene generator that transmits scene data to an array of deflectable digital micromirror to create a non-visible image for use by a non-visible detecting system. For example only, a non-visible image would include but not be limited to infrared and ultraviolet images. The detecting system under test typically uses an image sensor to detect the image and respond to the scene generated. In a sophisticated embodiment of a non-visible image simulation system, an optional controller monitors the response of the image sensor to provide feedback to the scene generation device to allow the scene generation device to update the scene perspective. Provision may also be made to allow a human operator to control the image sensor to allow training personnel in a simulated environment. This system has the advantage of being flexible, and depending on the modulation scheme selected, does not require synchronization of the image sensor and image projector. The system may generate the image using either phase or amplitude modulation.

BRIEF DESCRIPTION OF THE DRAWINGS

FIG. 5b is a section view of the digital micromirror device of FIG. 5a taken along line B—B of FIG. 5a.

FIG. 8b is a section view of the analog micromirror device of FIG. 8a taken along line B—B of FIG. 8a.

DETAILED DESCRIPTION OF THE PREFERRED EMBODIMENTS

Figure 1A:
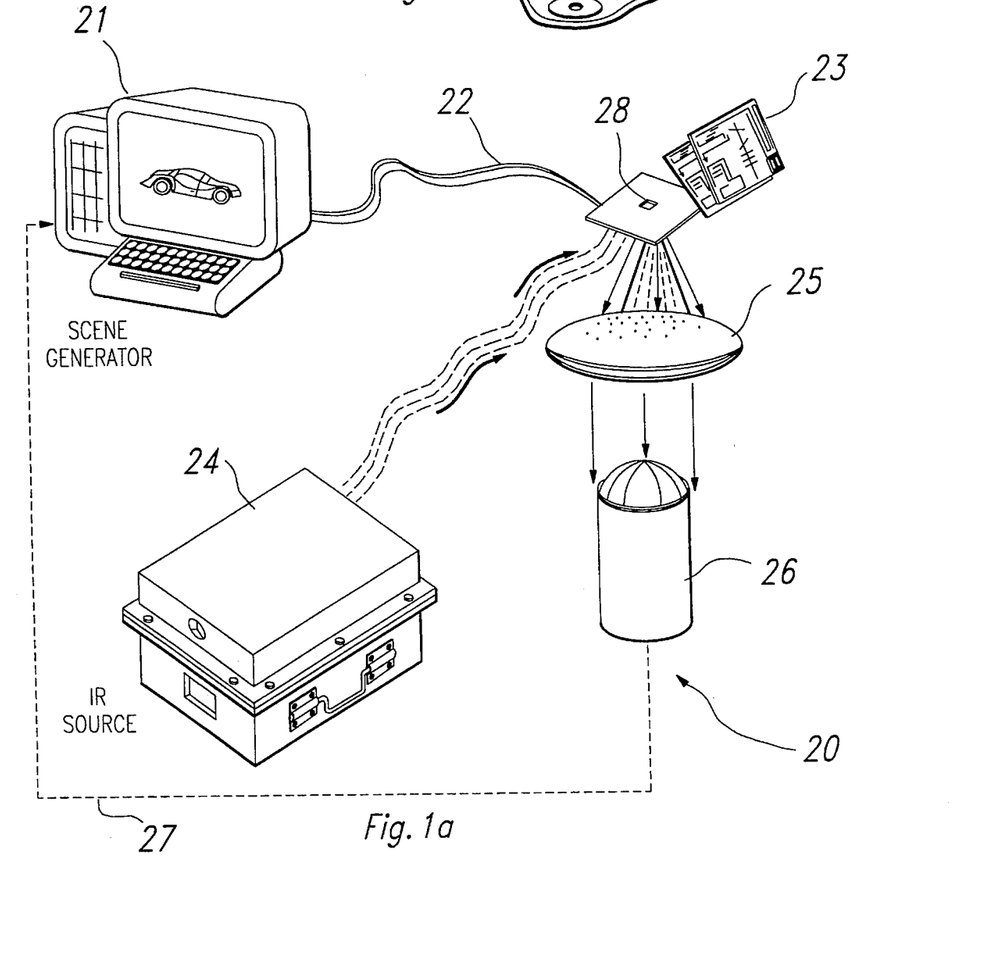
FIG. 1a is a pictorial view of one embodiment of a basic infrared image simulation system.

FIG. 1a is a pictorial view of one embodiment of an image simulation system depicted generally as 20. In FIG. 1a, scene generator 21 produces an electronic representation of a scene. The electronic signals are sent along graphics pipeline 22 to a digital micromirror device (DMD) projector system 23. DMDs are described in U.S. Pat. No. 5,096,279, "Spatial Light Modulator and Method" issued Mar. 17, 1992, and U.S. Pat. No. 4,954,789, "Spatial Light Modulator" issued Sep. 4, 1990 and are comprised of an array of micromirror, formed on a single substrate. A radiation source, in this case an infrared source 24, outputs non-visible electromagnetic radiation which reflects off of the DMD and passes through lens 25 to the sensor system 26. The infrared source shown is a blackbody source. Blackbody sources are emissive devices designed to emit a uniform distribution of infrared radiation at a predetermined temperature. Also as shown, sensor system 26 may also include an optional output signal to the scene generator 21 as shown by dashed line 27.

The invention may use other non-visible radiation frequencies, such as ultraviolet, in addition to infrared. As the frequency changes some of the DMD parameters may change. For example, longer wavelengths typically require larger mirrors in order to maintain an equivalent image quality.

Figures 1B, 1C:
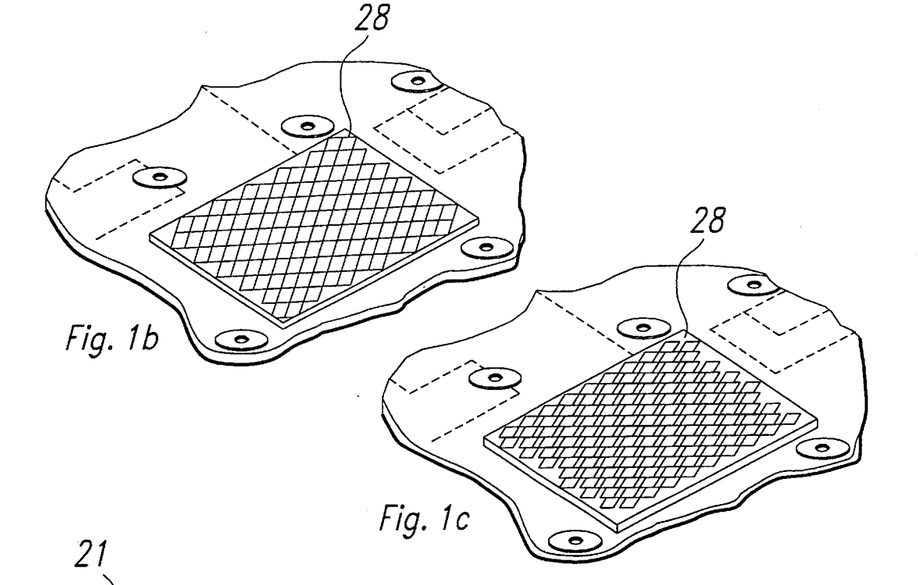
FIG. 1b is an stylized pictorial view of the DMD of FIG. 1a showing undetected mirrors.
FIG. 1c is an stylized pictorial view of the DMD of FIG. 1a showing undetected mirrors.

An stylized enlargement of the DMD 28 is shown in FIGS. 1b and 1c for purposes of explanation only. In FIG. 1b, all of the mirrors of the DMD are shown undetected. In FIG. 1c, all of the DMD mirrors are shown deflected. It will be appreciated, of course, that in actual practice, to achieve an image with an acceptable resolution, the number of mirror elements in an array would typically be on the order of a quarter of a million or even more, and not less than a hundred as shown in FIGS. 1b and 1c. Deflection of each individual mirror element determines whether or not the incident infrared radiation will be reflected as part of the image projected towards the sensor system 26. And, of course, to generate an image such as the automobile shown on the display screen of scene generator 21, only selected ones of the mirror elements of an array would be addressed and deflected. If all of the mirror elements of an array were deflected or mined on, there would simply be a bright spot of infrared light, not a particular image.

Figures 2, 3:
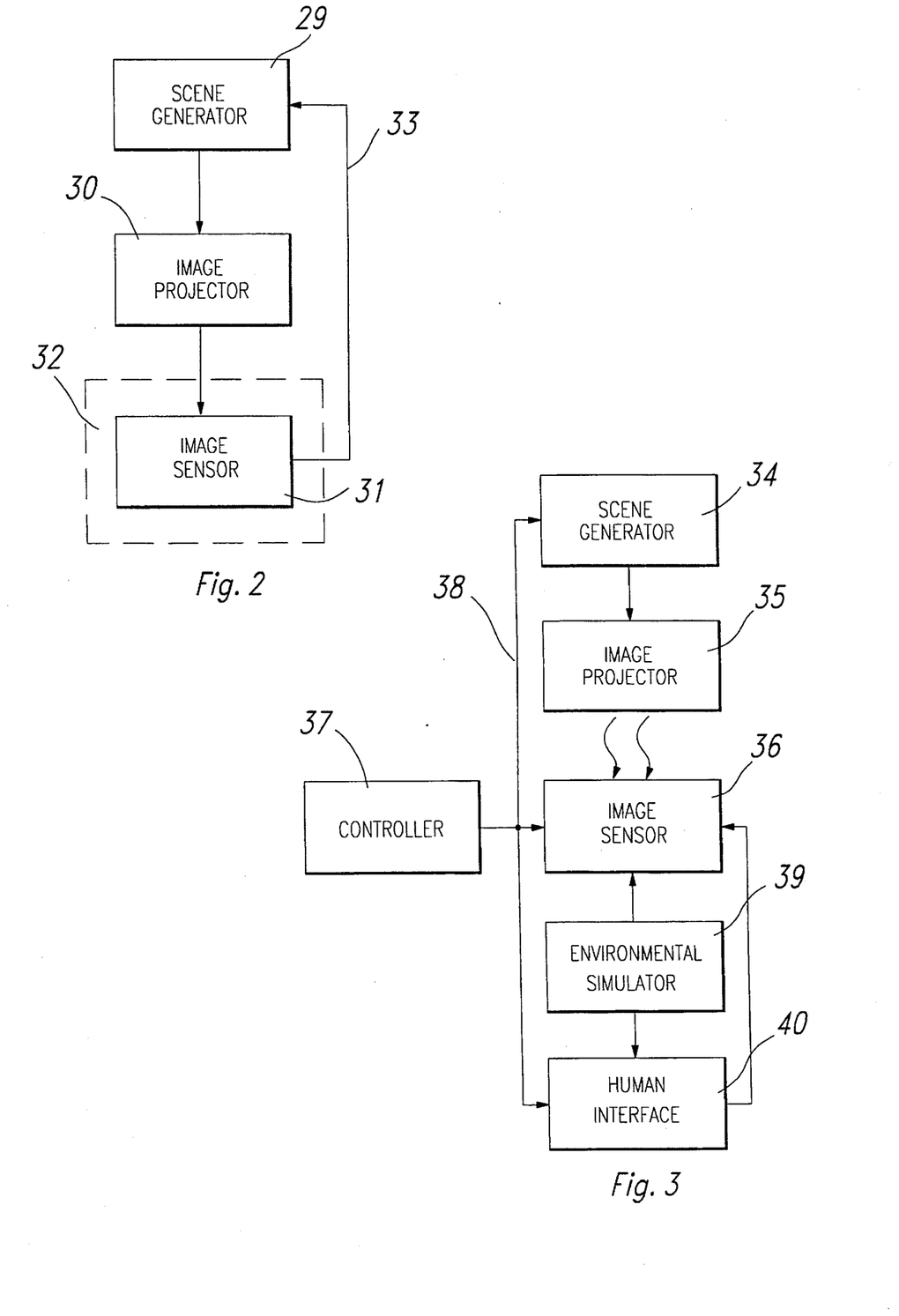
FIG. 2 is a block diagram of one embodiment of a basic image simulation system.
FIG. 3 is a block diagram of another embodiment of an image simulation system.

FIG. 2 is a block diagram of a basic image simulation system. Scene generator 29 provides the digital information necessary for image projector 30 to create an image. Typically the scene generator will be a workstation or minicomputer in addition to the software necessary to generate the digital scene data, at a rate up to and including real-time. Rather than creating an image, the scene generator could simply read a pre-recorded image that has been stored in a machine-readable format. Displaying a pre-recorded image limits the flexibility of the image simulation system but allows operation with a less powerful scene generator. Depending on the requirements of the image sensor 31 used by the non-visible detection system 32, the projected image may consist of a simple geometric pattern or rendered perspectives of many objects. The image sensor 31 requirements also determine the required data frame rate and the resolution of the projected image. As a function of the image sensor 31, optional feedback data 33 from the detector system 32 could be used by the scene generator to update the image perspective. The feedback capability would be useful if the output of the image sensor 31 controlled the using system in some manner. As an example, the detector system may be an automotive FLIR capable of applying the brakes in response to an eminent collision.

The system shown in FIG. 2 would allow end-to-end testing of an image sensor. The block diagram of a more complex test environment is depicted in FIG. 3. The system of FIG. 3 includes a scene generator 34, image projector 35, and image sensor 36 subsystems as in FIG. 2, and adds a system controller 37 to coordinate the operation of the subsystems. The system controller sends data to and receives data from the subsystems via system control bus 38. An environmental simulator 39 may be added to allow motion of the image sensor and to simulate the intended operating environment of the image sensor. The environmental simulator may include a roll table, a temperature chamber, or a vibration table. The environmental simulator may also generate inertial measurement test signals to allow realistic testing of inertial guidance and pointing systems.

The system of FIG. 3 could also include a controller interface 40 to allow either automatic or human operator control, or perhaps both automatic and human operator control of the image sensor. The human interface would allow the system to be used to train operators and test system characteristics in a controlled, realistic environment. The combination of a human interface and realistic scene generation capability would allow system operators to train in conditions that simulate actual conditions. For example, the system could simulate driving with an automotive FLIR in heavy fog.

Figure 4:
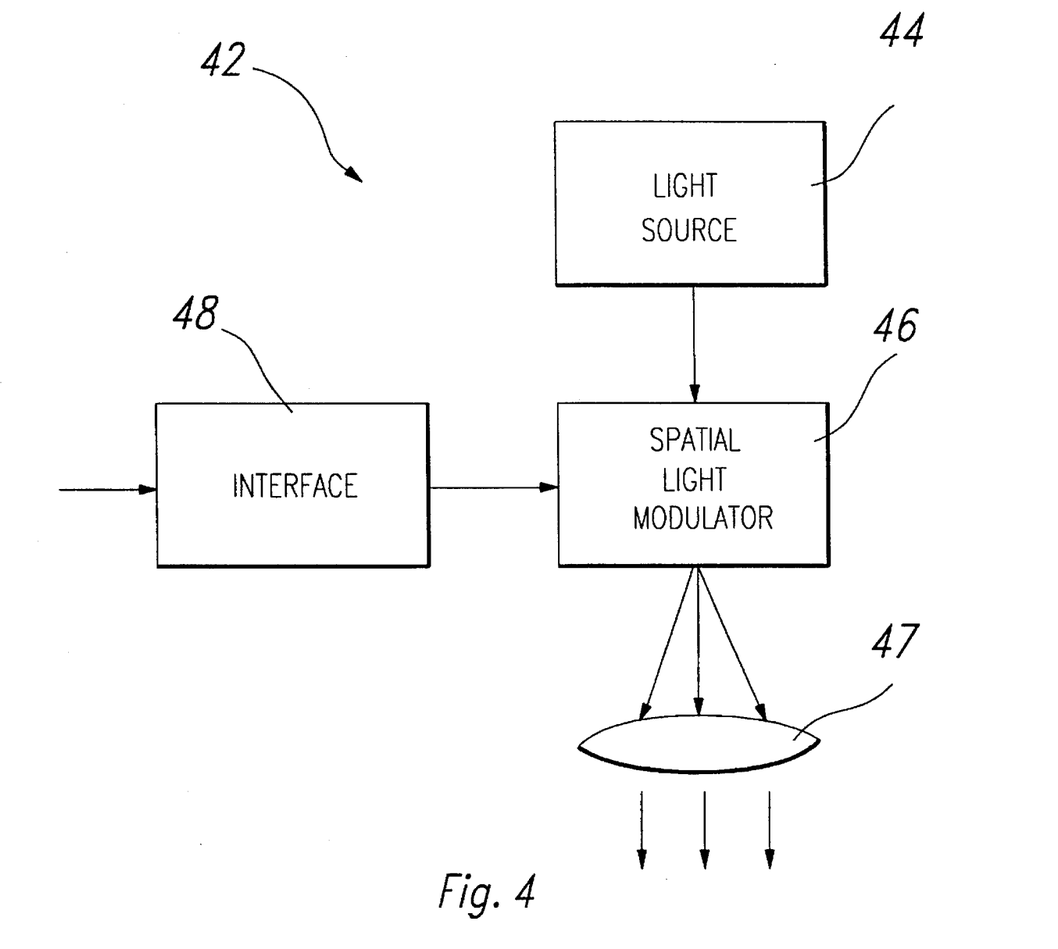
FIG. 4 is a block diagram of one embodiment of an image projector.

FIG. 4 is a block diagram of one embodiment of an image projector 42 similar to image projectors 28 or 33. Image projector 42 includes a electromagnetic radiation source 44 for supplying radiant energy to a DMD 46, an optional collimating lens 47, and an interface 48 for converting the received digital scene information to the signals required to control the DMD. Depending on the application and the modulation scheme chosen, the radiation source 44 may be either coherent or non-coherent and may output radiation over any portion of the non-visible spectrum including the infrared and ultraviolet regions. Typically the radiation will be infrared energy in the 8–12 μm band. In the infrared region, either a $CO_2$ laser or a blackbody source is typically used as a radiation source.

DMDs are formed on a single substrate and are comprised of an array of micromirror, each micromirror is typically 17 μm to 100 μm square. DMDs operate in response to a voltage potential between an address electrode fabricated on a substrate and a reflective surface or mirror suspended over the address electrode. The mirror is separated from the address electrode by a spacer layer. The spacer material is removed from the area above the address electrode forming a well to facilitate movement of the mirrors. The voltage potential results in an electrostatic attractive force between the address electrode and the mirror.

Digital micromirror devices have a rigid mirror that is supported by one or more flexible hinges. A digital micromirror device mirror deflects into the well in response to the electrostatic attraction between the address electrode and the mirror. Depending on the design of the digital micromirror device, the hinges will either bend or twist to allow the mirror to deflect.

The voltage required to deflect the mirrors depends on the mechanical design of the devices. The mirrors may be operated in either a digital mode or an analog mode. In the digital mode, the address voltage is one of two levels. The first voltage level fully deflects the mirror one direction. The second voltage level either does not deflect the mirror or deflects the mirror a second direction. In the analog mode, an analog voltage is used to deflect the mirror to a selected angular or vertical position. Whether the DMD is operated in a digital or analog mode depends on the design of the DMD and the modulation scheme chosen. Interface 48 receives digital scene data from the scene generator and formats the data for the DMD. The interface 48 also translates the data to the voltage levels required by the DMD and controls the display timing for the DMD.

Figure 5A:
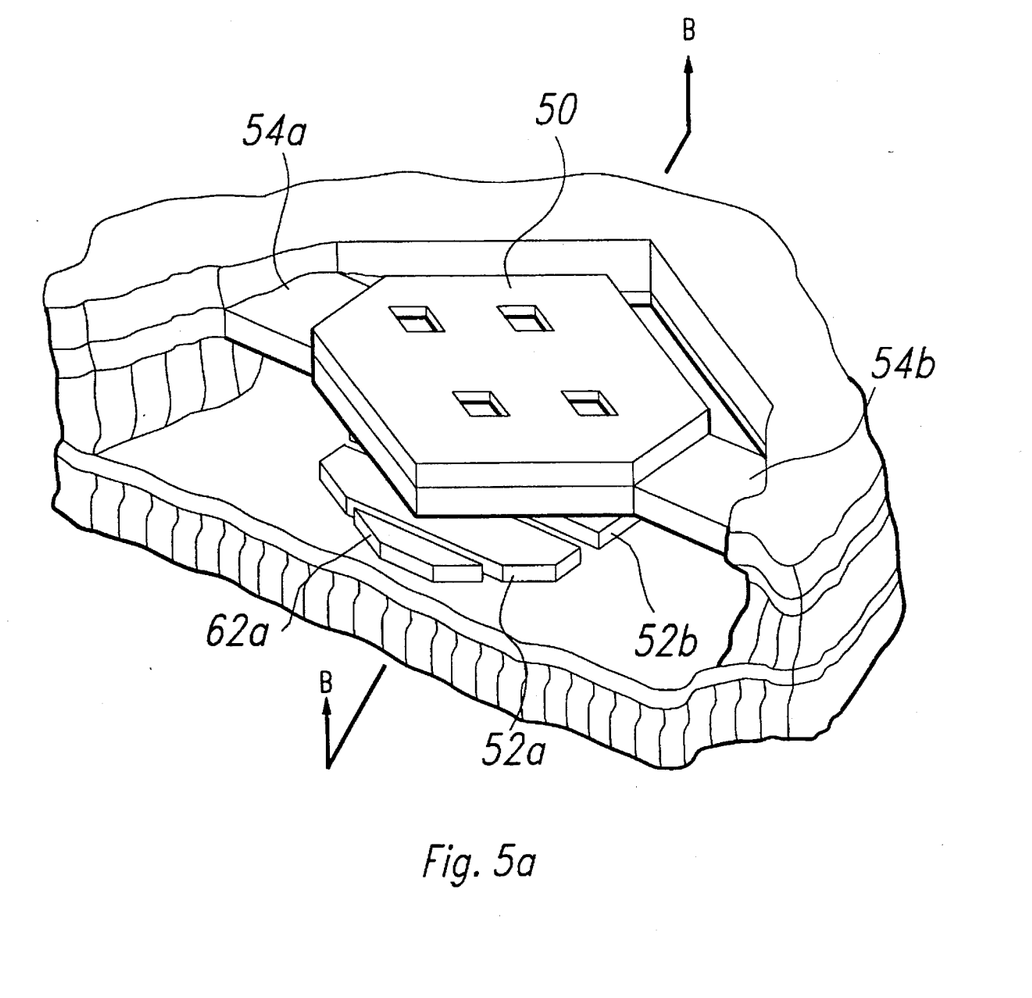
FIG. 5a is a perspective view of one embodiment of a torsion beam digital micromirror device.
Figure 5B:
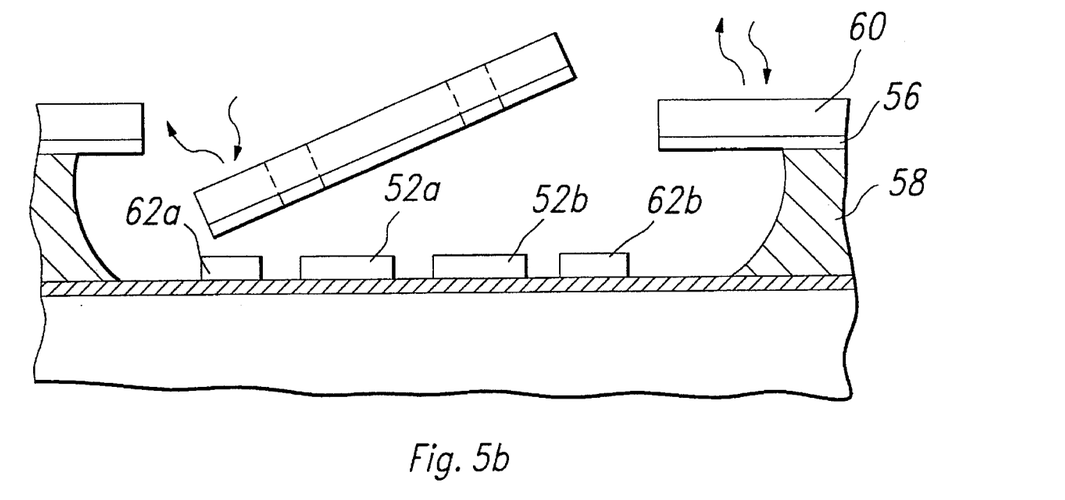

DMDs may be used to modulate the phase, amplitude, or both the phase and amplitude of incident electromagnetic radiation. While in practice the modulation of phase and amplitude is generally coupled, one response dominates the other. For the purposes of this disclosure the incidental response will be ignored. Depending on the design of the DMD and the modulation scheme chosen, DMDs may generate an amplitude only image, a phase only image, or an amplitude and phase image. The image sensor viewing the image will determine what type of image is required and therefore which modulation scheme is required to generate the image. For amplitude only images, a torsion beam DMD may be used with either analog or digital addressing. FIG. 5a and 5b are perspective and section views of a typical torsion beam DMD. In FIG. 5a and 5b, the mirror 50 is suspended over address electrodes 52a and 52b by two torsion hinges 54a and 54b. The hinges are formed by depositing a thin metal layer 56 on a planarizing spacer layer 58. A thick metal layer 60 is deposited to form the mirror. After the metal layers have been deposited and patterned, the portion of the spacer layer 58 below the hinges and mirror is removed, typically by plasma etching. Also shown in FIG. 5a and 5b are landing electrodes 62a and 62b. The landing electrodes are held at the same potential as the mirror and prevent the mirror from touching the address electrodes.

In operation, each mirror typically represents one pixel of the image, although analog full complex modulation, as detailed below, requires two mirrors on one axis of a two dimensional array for each image pixel. Typically an array of mirrors is fabricated on 17 μm centers with a gap of 1.2 μm between the mirrors and approximately 2.0 μm between the mirror and the address electrode. Larger mirrors cause less diffraction but are more difficult to manufacture and typically have lower yields. Larger mirrors will also rotate less if the initial air gap remains constant. Diffraction is also related to the wavelength of the incident radiant energy. For a constant mirror size, diffraction increases with longer wavelengths. A mirror size of 50 to 100 μm square is preferred for infrared energy in the 8–12 μm band although smaller mirrors are adequate for some applications.

DMDs are ideal modulators for several reasons. DMDs have very little mass allowing a very short mirror response time. Because each DMD is highly reflective, it is optically efficient. The metal hinges provide a low thermal resistance path from the mirrors to the substrate. This combination of high reflectance and low thermal resistance prevents the mirrors from heating significantly when using an infrared source. Roughly the same amount of energy is incident to, and absorbed by, the DMD mirrors regardless of whether the pixel is turned on or off. This results in the uniform heating of all of the mirrors in the DMD array, eliminating the image smear and ghosting problems associated with other image projection systems such as resistor arrays.

DMD arrays are constructed with many elements, typically 512 by 512 to 1080 by 1920 depending on the mirror size, which ideally allows the DMD array to oversample the image sensor detector. The oversampling increases the image resolution and the contrast ratio while simultaneously adding redundancy and simplifying the alignment of the array and image sensor. As shown below, for applications that do not require a large field of view (FOV), a 512 by 512 array of 50 μm mirrors can be used in a projector system with a 1 meter focal length collimator to produce an instantaneous field of view (IFOV) of 50 μrad and a total FOV of 1.5°. Both the IFOV and FOV could be increased or decreased by changing the system optics or the array size.

$$IFOV_{per\ DMD\ mirror} = \arctan(50\ \mu m/1\ m) = 50\ \mu rad$$

Total $FOV = 50 \mu rad * 512 = 1.5°$

Figure 6:
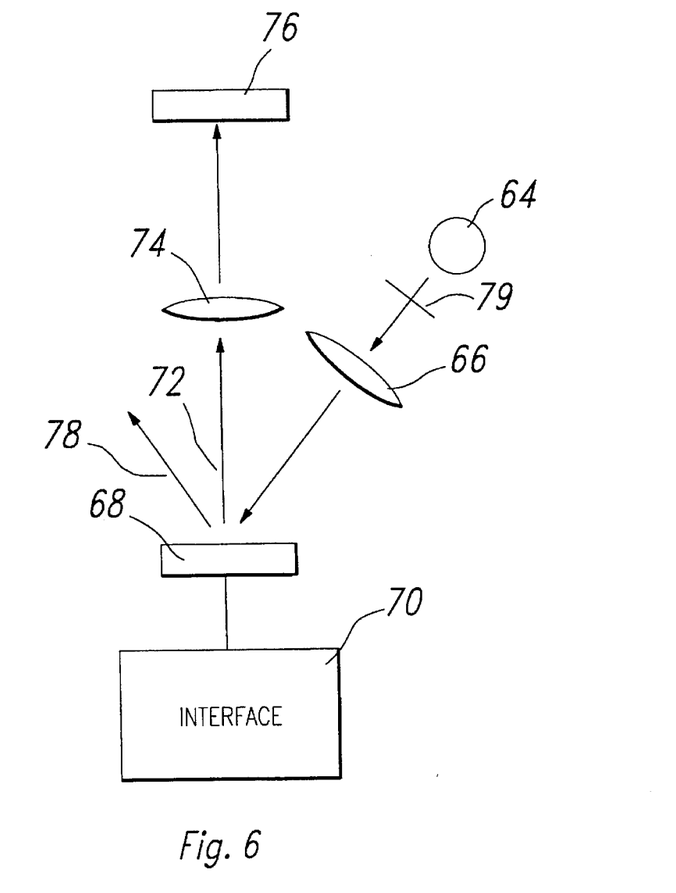
FIG. 6 is a schematic view of one embodiment of an image projector using a digital torsion beam micromirror device.

FIG. 6 is a simplified schematic diagram of one embodiment of an image projector using a digital torsion beam DMD. Energy from source 64 is focused by lens 66 onto a DMD array 68. The mirrors on DMD array 68 are tilted either clockwise or counter-clockwise by signals generated by the interface circuit 70. If the mirrors are rotated clockwise, the energy is reflected along path 72 through lens 74 to the image plane 76 creating an amplitude only image. If the mirrors are rotated counter-clockwise the energy is reflected along path 78 and is not used to form the image. FIG. 6 also shows an optional shutter 79 to control incident energy.

Because the digital torsion beam DMD allows only two brightness levels, fully on and fully off, pulse width modulation is typically used to create the appearance of additional brightness levels. Pulse width modulation allows each mirror to be turned on for sub-frame periods which alters the duty cycle of each pixel. If the pixel is turned on and off fast enough, a human eye or integrating detector will average the energy received from the pixel and the pixel will appear to have an intermediate brightness level that is constant.

Figure 7:
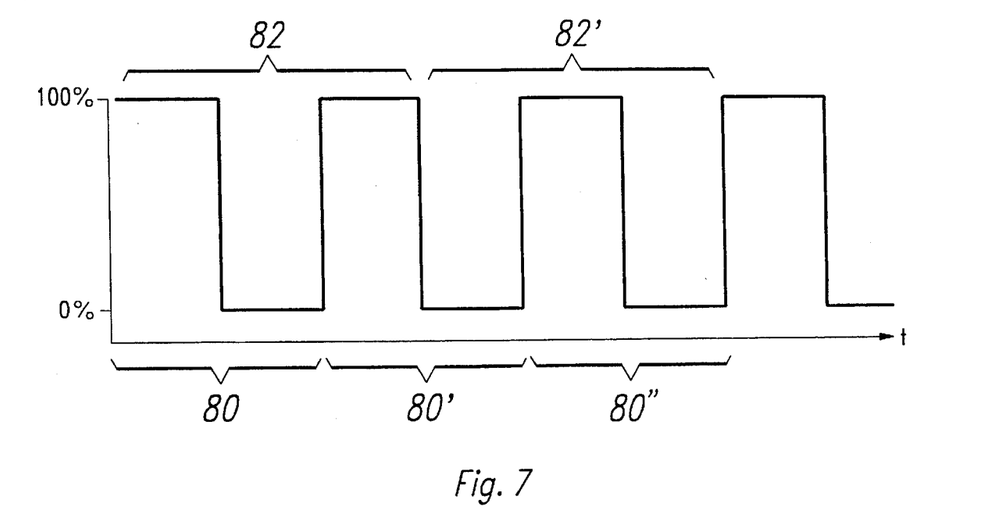
FIG. 7 is a timeline showing pulse width modulation of a digital micromirror device element.

Although pulse width modulation does allow a digital display to generate a gray scale output, pulse width modulation can create flicker problems when the image projector and image sensor are not synchronized. FIG. 7 shows a timeline for one digital pixel with a duty cycle of 50%. The vertical axis represents instantaneous pixel brightness which is either 100% or 0% for a digital DMD. For each projector frame period 80, 80', and 80", the pixel is on during the first half frame and off during the second half frame. Periods 82 and 82' show sensor dwell or 'on' times. The image sensor quantizes the photons received during each sensor frame period 82 and 82'. Because the two frame rams are not synchronized, the sensor will see frames alternating between the 66% and 33% brightness levels. The severity of image flicker depends on the relative frame rates, the brightness level displayed, and the manner in which the frame period is subdivided to implement the modulation scheme.

To eliminate the image flicker problem, the image projector and image sensor could be synchronized. If the image sensor latches an entire frame of data at one time, then interface 48 could synchronize the operation of the image projector and image sensor, typically by letting the image sensor free-run and synchronizing the image projector to it. However, typical image sensors read data serially one pixel at a time or by specific row or column addresses. Even image sensors that are considered staring sensors are electronically addressed in such a fashion as to effectively become scanning sensors. If the image data is not latched one frame at a time but rather is serially read pixel by pixel, then interface 48 will have to have the capability of addressing the DMD array in the same sequence. A related problem is caused by the order in which the image sensor reads the image data from the detector. Not only would the frame periods have to be synchronized, but the order in which the pixels are written to by the image projection would have to be coordinated with the order in which the pixels are read by the sensor. This would require interface 48 to include an addressing matrix to alter the ordering of the pixels dependent on the sensor being used. In a production testing environment this would require the interface to be modified, possibly through software, for each image sensor design.

Typical digital DMD mirror arrays do not allow the mirrors to be individually addressed. In order to optimize the data flow onto the DMD chip, data is shifted into the chip one row at a time. Blocks of mirrors are electrically connected so that one bias line biases the mirrors for a large portion of the array. These features generally hamper efforts to individually control one mirror but are not a problem if the designer selects a typical electronic addressing technique.

Figure 8A:
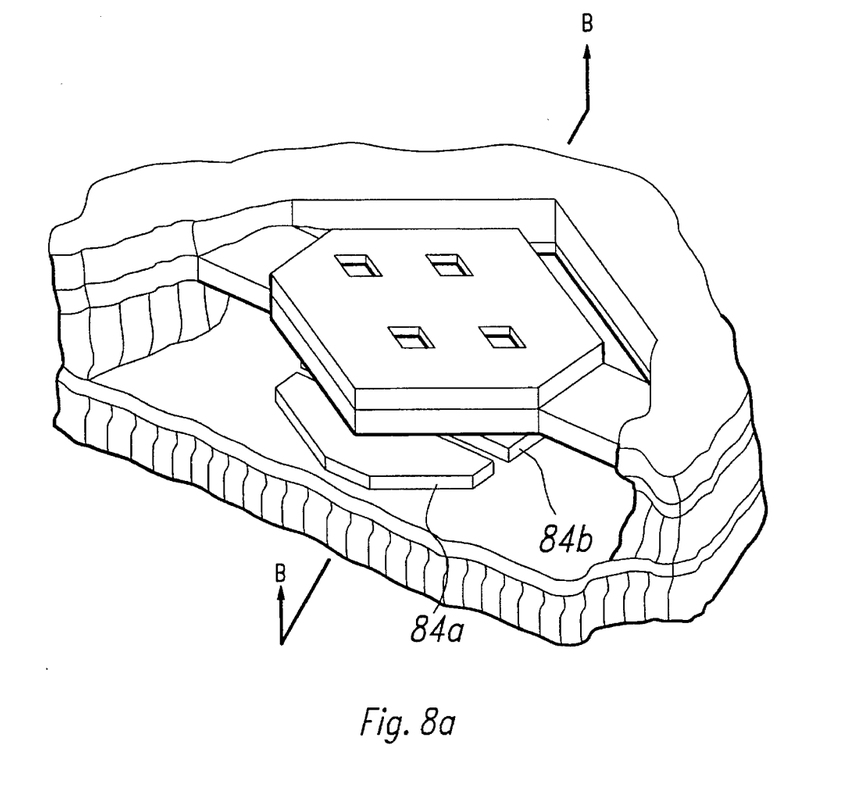
FIG. 8a is a perspective view of one embodiment of a torsion beam analog micromirror device.
Figure 8B:
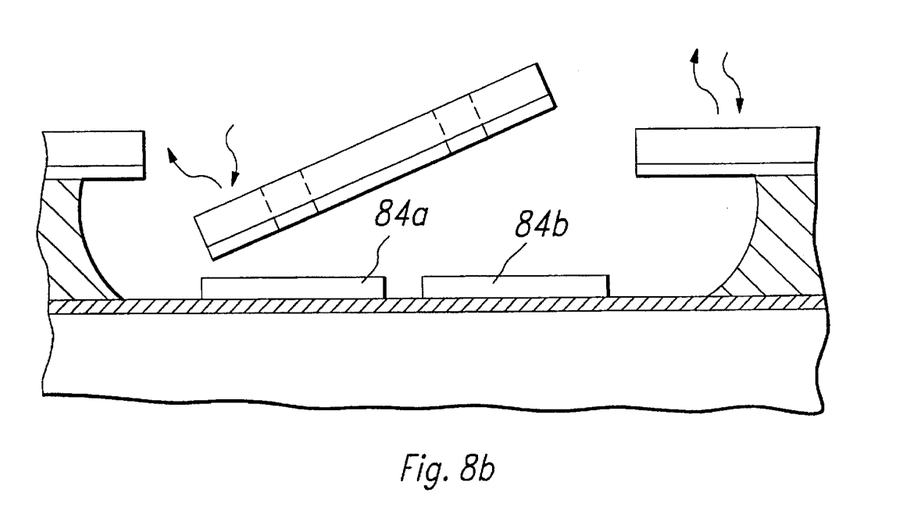
Figure 9:
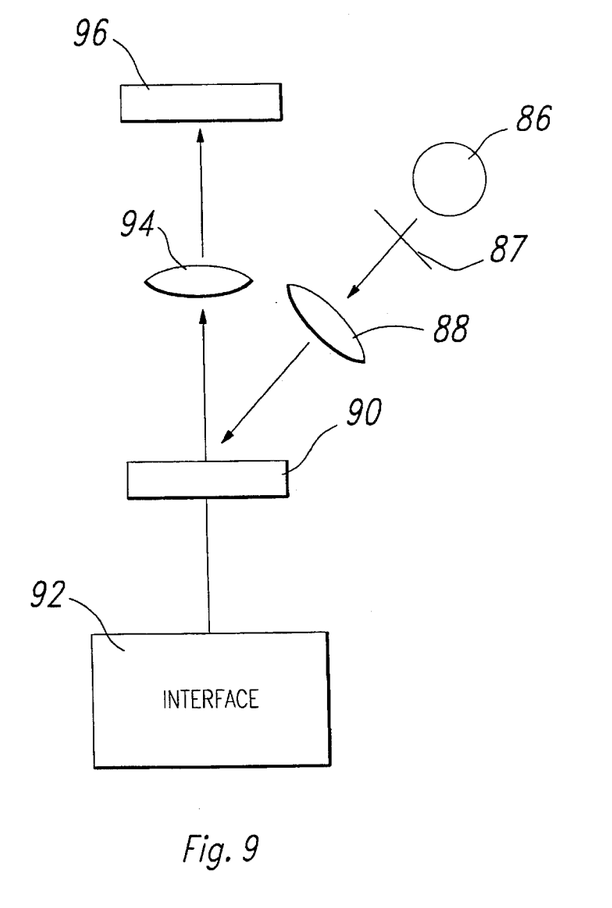
FIG. 9 is a schematic view of one embodiment of an image projector using an analog torsion beam micromirror device.

Analog modulation, or beam-steering, may be used to create high contrast amplitude images using a torsion beam or cantilever beam DMD. When analog modulation is used, landing electrodes may be used but are not necessary if the mirror rotation is limited. FIG. 8a shows a torsion beam DMD having enlarged address electrodes 84a and 84b and no landing electrodes. Only one address electrode is necessary if the beam is only required to rotate one direction. FIG. 9 is the block diagram for one possible system layout. In FIG. 9, radiant energy from source 86 passes through the optional shutter 87 and is focused by lens 88 onto DMD 90. Interface 92 generates voltage deflection signals to deflect each mirror of DMD 90. If a mirror is fully deflected, all of the energy reflected by the mirror will pass through lens 94 and be focused into a bright pixel on the image plane 96. As the deflection of the mirror is decreased, less of the reflected energy will pass through the lens and that pixel will become dimmer. To prevent mirror collapse, the mirror and address bias potentials are typically chosen to limit travel of the mirror to about ⅓ of the distance between the undetected gap. The optical layout could be reversed to allow an undeflected pixel to be bright and a fully deflected pixel to be dark. As the mirror deflection changes the brightness of the pixel changes while the pixel remains stationary on the image plane.

Figure 10:
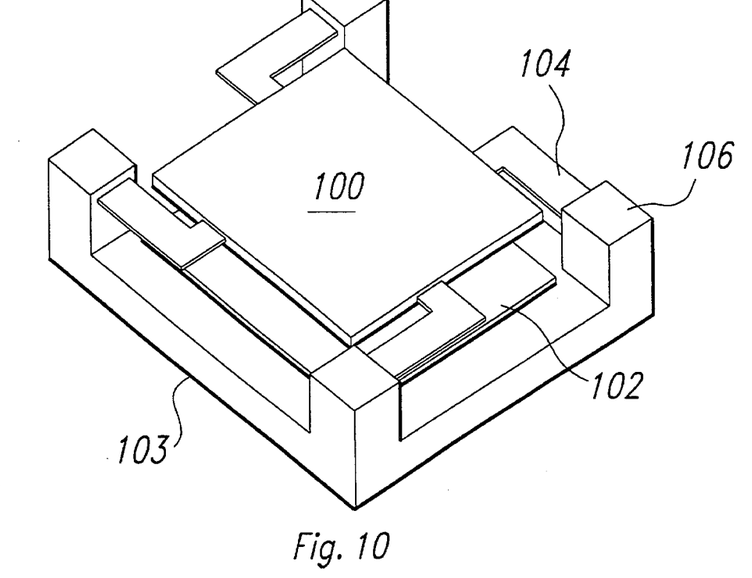
FIG. 10 is a perspective view of one embodiment of a flexure beam micromirror device.

Phase images may be generated using a phase modulation method taught by U.S. Pat. No. 5,148,157, "Spatial Light Modulator With Full Complex Light Modulation Capability", issued Sep. 15, 1992. This embodiment of phase modulation uses a flexure beam DMD array, one element of which is shown in FIG. 10. Flexure beam DMD 98 is comprised of a mirror 100 suspended over an address electrode 102 by hinges 104 which are attached to support posts 106. Typically there are four hinges and support posts, but DMDs may be fabricated having a greater or lesser number of hinges and support posts. The electrostatic attraction between the mirror 100 and address electrode 102 causes the mirror 100 to deflect towards the address electrode, lengthening the optical path of the incident and reflected waves. For a constant bias voltage, as the distance between the mirror 100 and address electrode 102 decreases, the electrostatic force increases. If the mirror 100 is deflected too far, the electrostatic force will overcome the restoring force generated by the hinges 104 and the mirror will collapse to the address electrode, typically destroying the device. To prevent mirror collapse, the mirror and address bias potentials are typically chosen to limit travel of the mirror to about ⅓ of the distance between the undeflected air gap.

Figure 11:
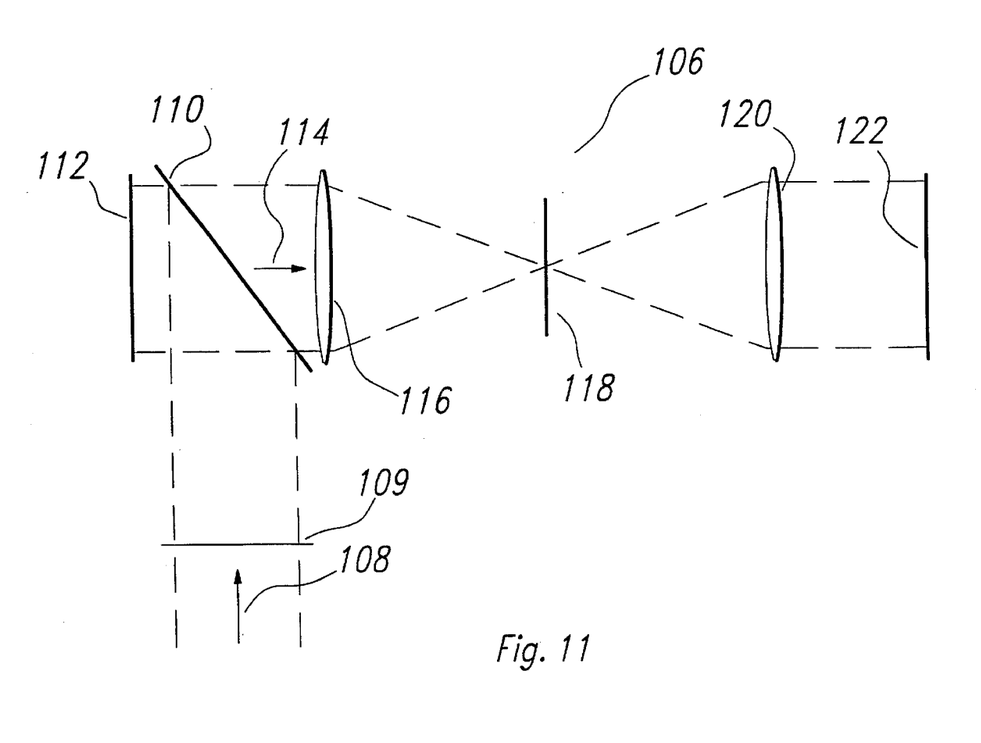
FIG. 11 is a schematic view of one embodiment of an image projector using a flexure beam micromirror device.

A phase and amplitude modulated image may be generated using the analog full complex method also disclosed in U.S. Pat. No. 5,148,157. For each image pixel produced, analog full complex modulation requires two mirror elements of the DMD array. The output of each pair of mirrors elements is resolved into one pixel element. Because two mirror elements are required, the image resolution produced by a given DMD array will be only half the resolution produced using the other modulation techniques. To maintain the same image resolution the DMD array must contain twice as many individual mirror elements which increases the dimension along one axis of a two dimensional array and also increases the manufacturing complexity. FIG. 11 shows one embodiment of an analog full complex image projector 106. Coherent energy enters the system along path 108, is passed through optional shutter 109, and is reflected by beamsplitter 110 onto DMD array 112. Each mirror element of DMD array 112 is individually deflectable to generate a phase modulated reflected wave. The reflected wave passes through the beamsplitter 110 along path 114. Lens 116 focuses the reflected wave onto a spatial filter 118 in the transform plane. The filtered energy passes through lens 120 and is collimated onto image plane 122. The resulting image will have both phase and amplitude modulation.

Figure 12:
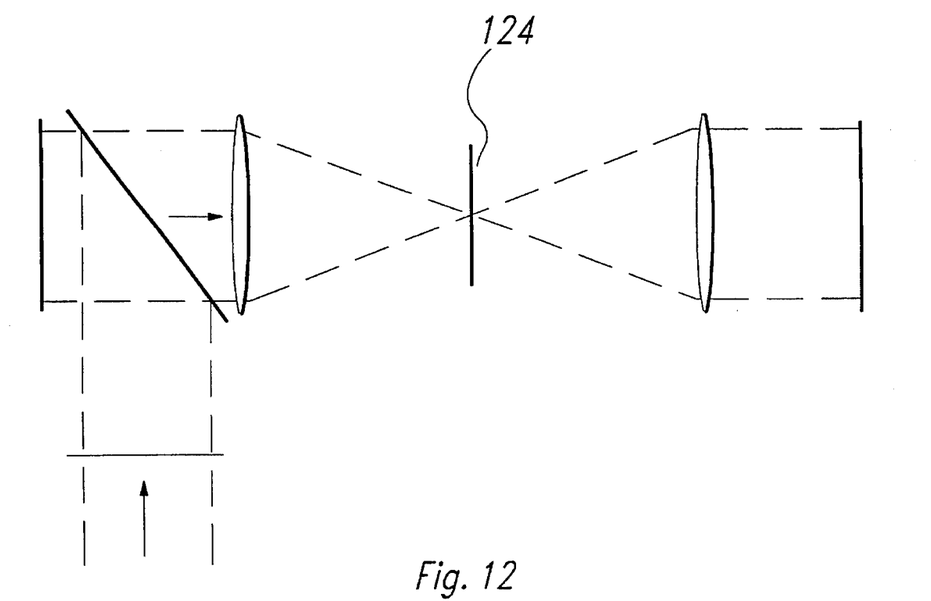
FIG. 12 is a schematic view of one embodiment of a phase contrast image projector using a flexure beam micromirror device.

A phase modulated wave can also be converted to an amplitude and phase modulated wave using a process called phase contrast modulation. Phase contrast modulation is taught in the U.S. patent application having Ser. No. 08/212,709 also assigned to Texas Instruments Incorporated and filed on the same date as the present invention. This copending application is incorporated herein by reference. The optics required for phase contrast modulation are shown in FIG. 12 and are very similar to the optics of FIG. 11. In FIG. 12, a phase plate 124 is placed in the transform plane instead of a spatial filter. The phase plate alters the phase of the zeroth-order component relative to the higher-order components. Typically the phase plate has an optical length ¼ wavelength longer through the zeroth-order portion compared to the higher order portion of the phase plate. The phase plate may be partially mirrored to attenuate, as well as retard, the zeroth-order component of the reflected wave. The purpose of the phase plate is to cause interference in the reflected wave thereby causing amplitude modulation in the reflected wave.

Figure 13:
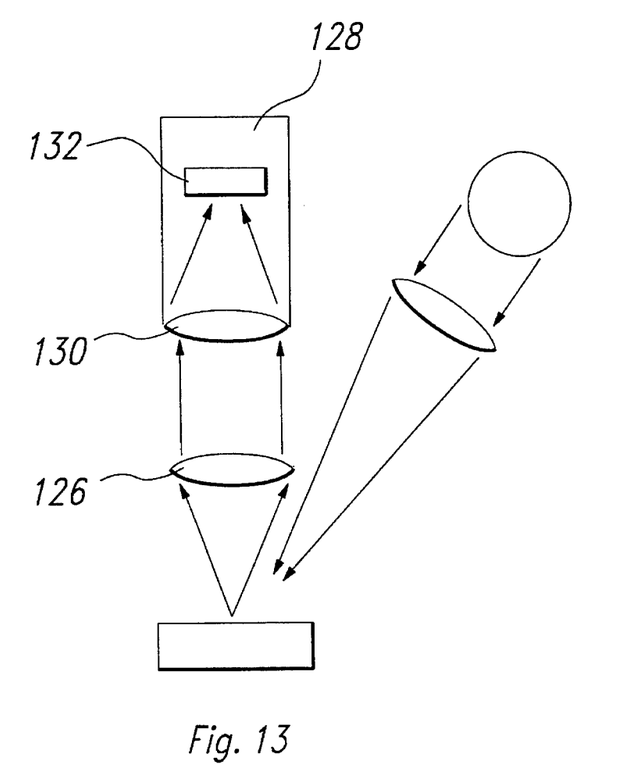
FIG. 13 is a schematic view of an interface between a torsion beam image projector and an image sensor.
Figure 14:
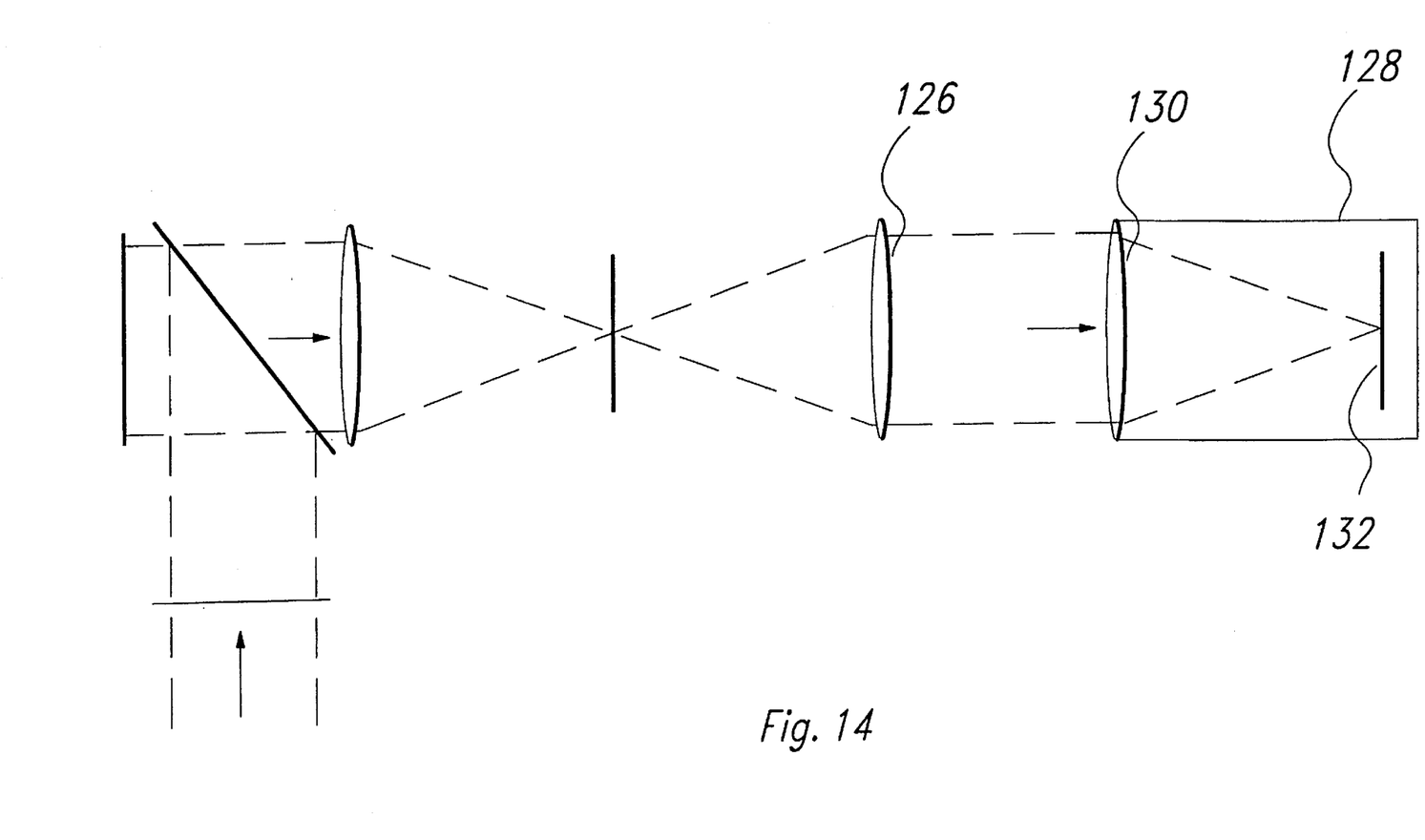
FIG. 14 is a schematic view of an interface between a flexure beam image projector and an image sensor.

Two interfaces between an image projector and an image sensor are shown in FIGS. 13 and 14. FIG. 13 shows an optical system using a torsion beam DMD and FIG. 14 shows an optical system using a flexure beam DMD. In both cases the collimated energy from the image projector output lens 126 enters the image sensor 128 through lens 130. The energy is focused by lens 130 onto detector 132. FIGS. 13 and 14, as well as FIGS. 6, 9, 11, and 12 are simplified to illustrate the concepts being taught. Transmission path lengths may be changed, and additional optics may be added, to any of the systems to enlarge or reduce the images, obtain the required resolution, or change the FOV or IFOV.

Thus, although there has been described to this point a particular embodiment for a method and system for creating a realistic image simulation environment, it is not intended that such specific references be considered as limitations upon the scope of this invention except in-so-far as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An image simulation system for providing a non-visible image for use by an image detection system, the image simulation system comprising:

a scene generator providing an electronic representation of a scene;

a source of non-visible radiant energy providing a beam of radiant energy traveling along a first path; and an array of flexure beam micromirror elements receiving the electronic representation from the scene generator and reflecting the beam of radiant energy along a second path, wherein each element of the array is deflected according to the electronic representation, each deflected element phase-modulating a portion of the beam of radiant energy.

2. The system of claim 1 wherein said non-visible radiant energy source is an infrared source.

3. The system of claim 1 further comprising:

an image detection system receiving the reflected beam of radiant energy; and an environmental simulator providing environmental stimuli to the image detection system to simulate dynamic operating conditions.

4. The system of claim 1 further comprising:

a first lens focusing the reflected beam onto a transform plane, wherein a zeroth-order component of the reflected beam and a higher-order component of the reflected beam are physically separated on the transform plane;

a phase plate in the transform plane of the reflected beam, the phase plate shifting the phase of the zeroth-order component of the reflected beam; and a second lens receiving the reflected beam from the phase plate and focusing the reflected beam onto an image plane, wherein the phase-shifted zeroth-order component interferes with higher-order component to form an amplitude modulated image.

5. The system of claim 1 further comprising:

a lens focusing the reflected beam onto an image plane, wherein portions of the reflected beam modulated by adjacent micromirror elements interfere to form an amplitude modulated image.

6. The system of claim 1 wherein said beam of radiant energy is coherent.

7. A method of creating a non-visible image for detection by an image sensor, the method comprising:

generating an electronic representation of a scene;

deflecting an array of flexure beam micromirror elements in response to the electronic representation of a scene;

reflecting a beam of radiant energy from the array of deflected micromirror elements;

forming an image with the reflected beam of radiant energy; and extracting information from the image with an image sensor.

8. The method of claim 7, wherein the forming step comprises:

focusing the reflected beam of radiant energy onto a transform plane to spatially separate the zeroth-order component from the higher-order component; and phase shifting the zeroth-order component of the reflected beam to form an amplitude modulated beam of radiant energy.

9. The method of claim 7, wherein the forming step comprises:

focusing the reflected beam of radiant energy onto an image plane such that portions of the reflected beam of radiant energy modulated by adjacent micromirror elements interfere and form an amplitude modulated image.

10. The method of claim 7 further comprising the step of simulating environmental forces acting upon the image sensor.

11. The method of claim 7 further comprising the steps of:

providing the extracted information to an operator; and modifying the operation of the image sensor based on a feedback signal from the operator.

12. The method of claim 7 wherein the beam of radiant energy is coherent.

13. An image simulation system for providing a non-visible image for use by an image detection system, the image simulation system comprising:

a scene generator providing an electronic representation of a scene;

a source of non-visible radiant energy providing a beam of radiant energy traveling along a first path;

an array of micromirror elements receiving the electronic representation from the scene generator and reflecting the beam of radiant energy along a second path, wherein each element of the array is deflected according to the electronic representation;

a projection lens focusing the reflected radiant energy reflected into an image such that the radiant energy reflected by each micromirror element forms an image pixel; and wherein each micromirror element is continuously variable between a first position wherein all radiant energy reflected by the element enters the projection lens and forms a bright pixel, and a second position wherein none of the radiant energy reflected by the element enters the projection lens thereby forming a dim pixel.

14. The system of claim 13 wherein said non-visible radiant energy source is an infrared source.

15. The system of claim 13 further comprising:

an image detection system receiving the image; and an environmental simulator providing environmental stimuli to the image detection system to simulate dynamic operating conditions.

16. The system of claim 13 wherein said beam of radiant energy is coherent.

17. A method of creating a non-visible image for detection by an image sensor, the method comprising:

generating an electronic representation of a scene;

deflecting an array of micromirror elements in response to the electronic representation of a scene;

reflecting a beam of radiant energy from the array of deflected micromirror elements;

focusing the reflected beam of radiant energy to form an image comprised of an array of image pixels, wherein the amount of radiant energy reflected from a micromirror element and focused onto an image pixel is determined by the amount the micromirror element is deflected; and extracting information from the image with an image sensor.

18. The method of claim 17 further comprising the step of simulating environmental forces acting upon the image sensor.

19. The method of claim 17 further comprising the steps of:

providing the extracted information to an operator;

modifying the operation of the image sensor based on a feedback signal from the operator.

20. The method of claim 17 wherein the beam of radiant energy is coherent.

* * * * *